United States Patent [19]
Calfo et al.

[11] 4,315,173
[45] Feb. 9, 1982

[54] DYNAMOELECTRIC MACHINES SEGMENTAL AIR GAP BAFFLE ASSEMBLY

[75] Inventors: Raymond M. Calfo, Braddock Hills; Gerald R. Alkire, New Alexandria; George F. Dailey, Plum; Arthur Mulach, Penn Hills, all of Pa.

[73] Assignee: Westinghouse Electric Corp., Pittsburgh, Pa.

[21] Appl. No.: 135,552

[22] Filed: Mar. 30, 1980

[51] Int. Cl.³ .............................................. H02K 9/00
[52] U.S. Cl. ....................................... 310/53; 310/59; 310/260
[58] Field of Search .................... 310/52, 53, 54, 55, 310/42, 57, 58, 59, 60 R, 60 A, 64, 65, 260, 258, 216, 259, 43

[56] References Cited

U.S. PATENT DOCUMENTS

| | | | |
|---|---|---|---|
| 3,110,827 | 11/1963 | Baudry | 310/55 |
| 3,413,499 | 11/1968 | Barton | 310/58 |
| 4,051,400 | 9/1977 | Armor | 310/53 |
| 4,118,645 | 10/1978 | Calfo | 310/53 |
| 4,208,597 | 6/1980 | Mulach | 310/260 |

*Primary Examiner*—R. Skudy
*Attorney, Agent, or Firm*—W. D. Lanyi

[57] ABSTRACT

A dynamoelectric machine's segmented baffle assembly comprises a baffle ring which is bolted to a back-up plate disposed in the stator core. The annular-shaped baffle ring is formed from a plurality of arcual segments, each segment secured by at least one of said bolts. For low flow rates of coolant gas, the air gap can be further reduced by means of a teflon insert located on the inner circumferential surface of the baffle ring. For expeditious access to the rotor assembly, only one of said segments need be.

7 Claims, 6 Drawing Figures

DYNAMOELECTRIC MACHINES SEGMENTAL AIR GAP BAFFLE ASSEMBLY

BACKGROUND OF THE INVENTION

This invention relates to a dynamoelectric machine and more particularly to an air gap baffle assembly for a turbine generator.

As is well known, large dynamoelectric machines such as turbine generators, produce heat when they are in operation due to the internal losses of the machine. To keep the machine operating within desirable temperature limits, a cooling gas such as hydrogen is forced through the machine to carry away the heat. Most large dynamoelectric machines have provisions for the necessary blower assemblies, heat exchangers, and coolant passageways to ensure adequate circulation of the coolant gas which maintains the temperature of the machine within acceptable operating limits. In order to keep the stator bore and the outer region of the rotor body (the area being commonly referred to as the air gap, whether or not air is the cooling gas) within these temperature limits, a fixed amount of cooling gas such as hydrogen is required to flow axially through the air gap. Since the blower on the dynamoelectric machine operates at the required pressure and associated volumetric flow rate, to ensure adequate cooling of the entire machine, the cooling gas flowing through the air gap must be regulated to a predetermined flow rate. The standard means of regulation is a restrictive device or baffle inserted at the entrance of the air gap area. This device must provide a preset controllable entrance area to the air gap with a minimum amount of leakage through secondary passages.

FIGS. 1 and 2 are schematic diagrams of one such prior art baffle design. FIG. 1 is a partial section view of a stator assembly, and a baffle ring. FIG. 2 is an end view of the baffle ring and a rotor, wherein the stator is removed.

In FIG. 1 of the prior art the portions of the stator assembly 100 that are shown include an end pack 105, a finger plate 102 and a stator winding 103. A prior art baffle ring 104 is seated approximately one inch into the bore of the machine where a seal is made between the ring 104 and the end pack 105; said seal being, for example, an impregnated dacron pad 112. The baffle ring is held in place by inserting under every other coil of the stator winding 103, another resin impregnated dacron pad 113; and then tying the baffle ring 104 in place with rope ties (not shown) which are secured to the stator end turns through holes 110. The regulation of gas flowing through the air gap is controlled through the use of a neoprene rubber insert seal 108. Because the installation and removal of the rotor assembly necessitates the insertion of tools beneath the rotor, there is a keystone area 107 cut out of the seal 108.

On the previous design as shown in FIGS. 1 and 2, a seal is made between the ring 104 and the stator bore at the point where the baffle ring 104 is seated. The seal was made by an impregnated dacron felt pad 112 as was discussed above. Since the quality of the seal depended upon the skill of the workmen, the secondary leakage area was somewhat undeterminable, and variable from machine to machine. It was difficult to apply the dacron felt pad 112 and, at the same time, hold the baffle ring 104 in a desired axial and radial location.

Another drawback with the prior design is that the baffle ring covered some of the stator iron, iron that is relatively easily damaged since it is at the end of the stator bore. There are other problems encountered by covering the end pack of the stator assembly. For example, inspection by the use of thermovision is very difficult. Also, as dynamoelectric machines have increased in size, it has become necessary to provide radial vents in the first end pack of the stator core for additional cooling. Of course this is made more difficult with the prior art baffle ring located radially inward of the end pack.

Furthermore, an important design criterion is that the rotor be accessible to permit use of assembly and disassembly tooling. In order to do this, a keystone notch 107 at the base of the baffle ring 104 was provided. In a machine with a large air gap, the entrance area in the region of keystone opening 107 may become so large as to impede the regulation of cooling gas flow.

Still another problem is the manufacturing difficulties associated with the installation of the rubber sealant, due to the resin filling and heating cycle.

Desirable therefore is a new design for the air gap baffle assembly; one that permits access to the rotor for assembly tooling, while at the same time permits simpler manufacturing, assembly and servicing techniques.

SUMMARY OF THE INVENTION

Disclosed is a dynamoelectric machine having a central shaft, a cylindrical rotor member mounted on said shaft for rotation therewith; and an annular stator member extending coaxially about said rotor member. The stator member includes a stator winding wound upon a laminated stator core. At the end of the laminated core is means for applying a clamping pressure; such as a finger plate, and a backup plate disposed between the finger plate and said core laminations. The backup plate is a rigid, non-magnetic plate of substantially the same configuration as the core laminations. It can, for example, be made of ¼ inch stainless steel.

According to the invention the backup plate extends radially inward into the air gap defined between the stator member and the rotor member. A baffle assembly, for regulating the flow of coolant through the air gap, is secured directly to the backup plate.

The baffle assembly, according to a preferred embodiment of the invention, includes a plurality of non-ferromagnetic bolts, each of said bolts having a bolt head at one end and a threaded portion at the other end. The bolts proceed through a baffle ring, made for example of a single filament wound glass; and secure the ring to the backup plate. The bolts can be secured to the backup plate through any means such as by providing a threaded bore through the backup plate to receive the threaded portion of the bolt. This can be accomplished by the utilization of a small washer which is tack welded to the inboard side of the backup plate. The plate and washer are drilled and tapped to receive the 5/16 inch stainless steel bolt. The bolt proceeds through bores in the filament wound glass ring; the bores being clearance holes of appropriate size for the bolts.

The above-mentioned backup plate can be constructed from a plurality of segmental plates which, when assembled in the stator assembly, has a generally annular geometry. On the radially inward portions of the backup plate are the bores for receiving the bolts; said bores arranged generally circumferentially and coaxially relative to the stator as well as the rotor assembly.

The baffle glass ring also can be segmented to promote expeditious assembly. Each arcuate segment of the baffle ring is secured to the backup plate via at least one of the bolts.

The rotor can therefore be accessed by the removal, for example, of only one of said segments of the baffle ring. For example, such a segment may be a 70° arc portion of the baffle ring.

In a second embodiment, and for more positive and reliable regulation of the coolant gas during low air gap flows, the generally annular-shaped baffle ring is equipped on its radially inward surface with a teflon insert. The teflon insert is held in position by a glass pin which is inserted through a bore in the baffle ring, from its outboard side; the side of the baffle ring on which is located the bolt heads.

BRIEF DESCRIPTION OF THE DRAWINGS

The invention will be more fully understood from the following detailed description taken in connection with the accompanying drawings, in which.

DESCRIPTION OF THE PREFERRED EMBODIMENT

Figure 1:
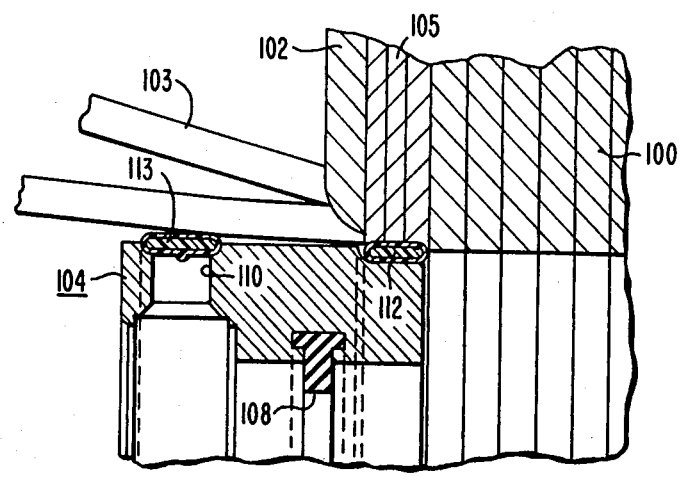
FIG. 1 is a partial schematic of a dynamoelectric machine showing a section of a prior art baffle assembly in relationship to the stator end region and the rotor assembly.
Figure 2:
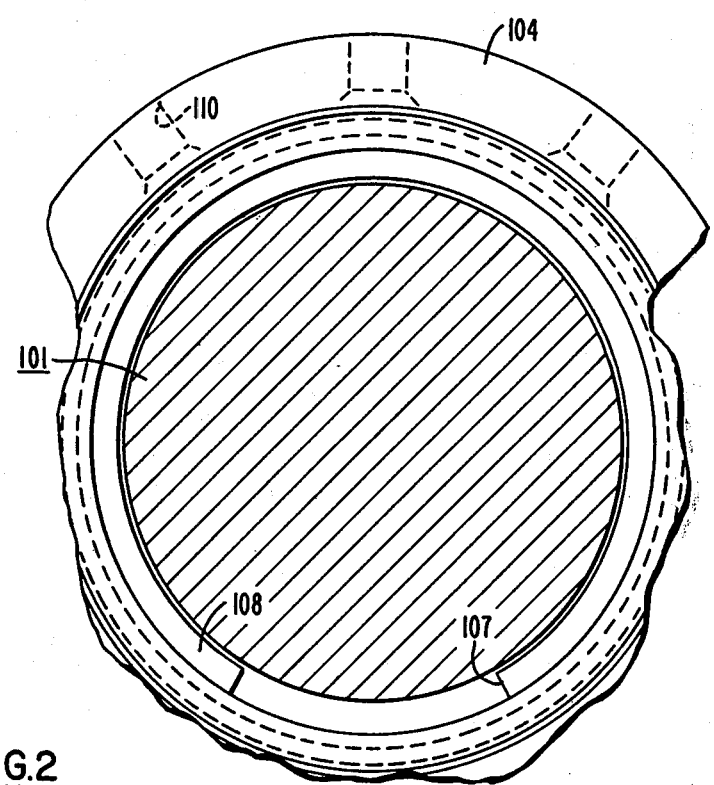
FIG. 2 is an end view of the prior art baffle assembly of FIG. 1 with the stator assembly removed.

Throughout the description which follows like reference characters refer to like elements on all the figures.

Figure 3:
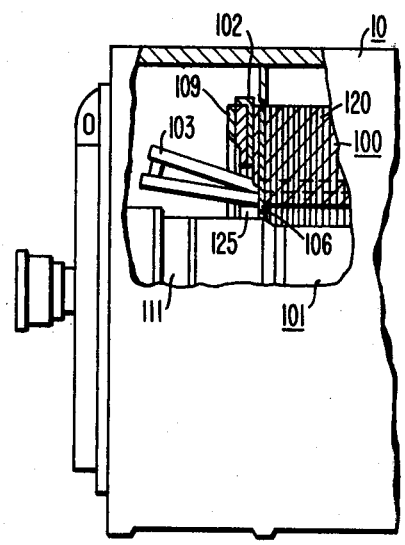
FIG. 3 is a side view, partly broken away, of a large synchronous generator.

FIG. 3 shows a typical construction for a large dynamoelectric machine 10 such as a turbine generator. The dynamoelectric machine 10 has a central shaft carrying a cylindrical rotor member, generally designated 101, and a tubular stator member 100 extending coaxially about said rotor member 101. The rotor member includes a retaining ring 111 and a rotor winding (not shown). The stator member 100 includes a stator winding 103 wound upon a laminated stator core 120. At the end of the stator core 120 is means 109 for applying a clamping pressure. The clamping means 109 includes a finger plate 102, and a backup plate 106 disposed between the finger plate 102 and the stator core laminations 120. Each of the laminations 120, for example, are constructed from thin (approximately 18 mils thick) electrical steel. The backup plate 106 is a rigid, non-magnetic plate of substantially the same configuration as the core laminations 120. For example, the backup plate may be a ¼ inch stainless steel segmented plate, which when assembled has a generally annular geometry. A baffle assembly 125 acts to regulate the flow of coolant through an air gap 124 defined by and between the inner circumference of said stator member 100 and the outer circumference of said rotor member 101. The baffle assembly 125 is secured directly to said backup plate 106.

Figure 4:
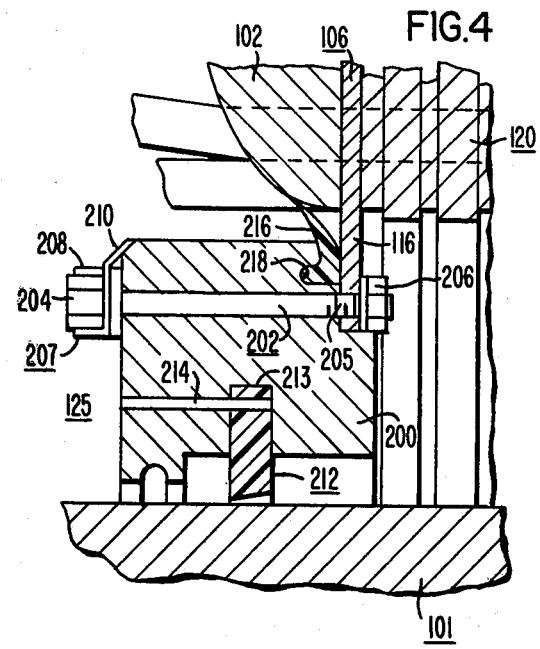
FIG. 4 is a side view of a section of the air gap baffle constructed in accordance with the embodiment of the invention.
Figure 5:
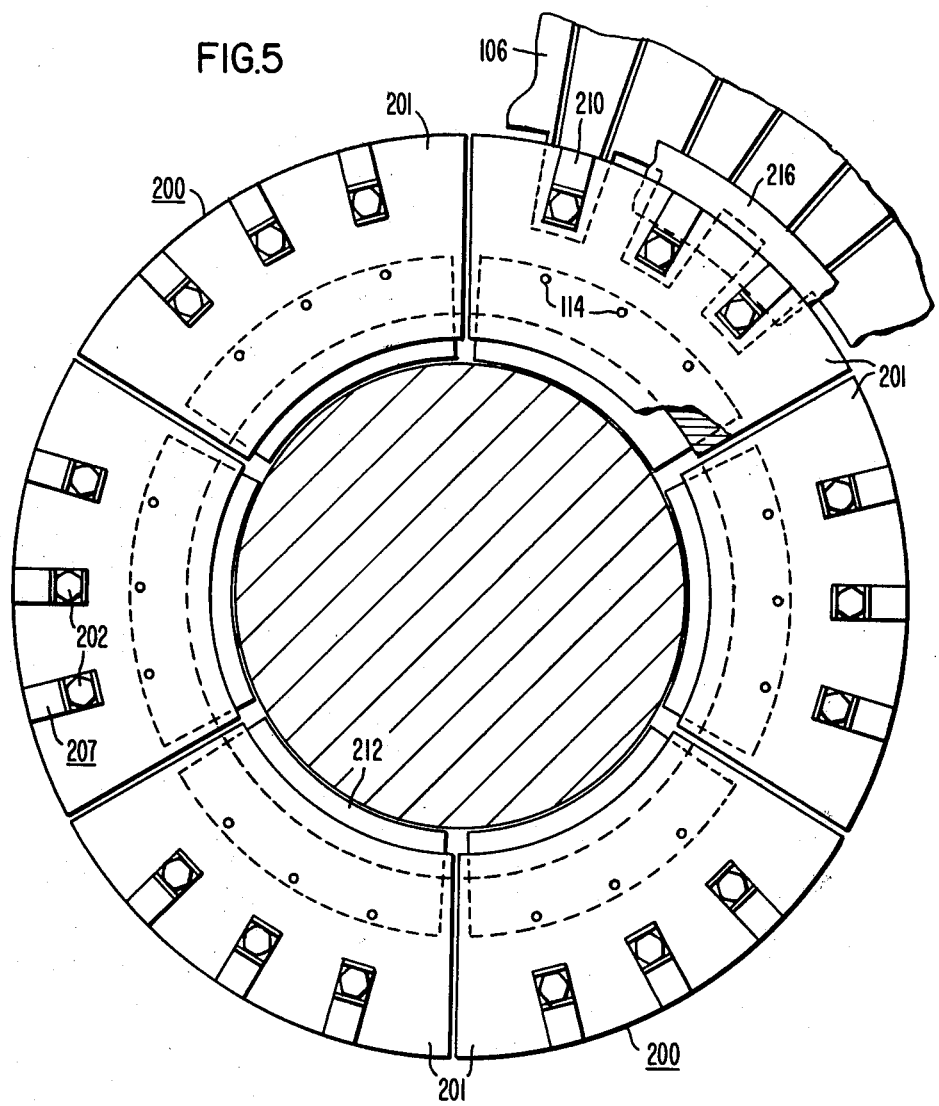
FIG. 5 is an end view of the baffle assembly of FIG. 4 with the stator assembly removed.

Referring now to FIGS. 4 and 5, the details of the baffle assembly 125 and the method for securing the assembly to the backup plate 106 is illustrated. A portion of the backup plate 106, called the teeth 116, extends radially inward of said stator laminations 120. In the teeth 116 are located a plurality of bores which are arranged circumferentially around the backup plate 106. This arrangement can be better understood with the aid of FIG. 6 in which the bores are designated 115.

The baffle assembly 125 includes a baffle ring 200 which for example may be a segmented annulus made of a filament wound glass. At a plurality of circumferential locations about the baffle ring 200 are located bores therethrough. Each of said bores is designed to receive a securing bolt 202 which is capable of positive engagement with said backup plate 106. For example, the bolt 202 may be a small (5/16 inch) non-magnetic stainless steel socket head cap bolt. Of importance is that it is made from a non-ferromagnetic material. As shall be discussed more fully below, at least one bolt 202 is located in each segmental part of the baffle ring 200.

A variety of means are available for securing said bolt 202 to said backup plate 106. A preferred means is threaded engagement. A small washer 206, for example, is tack welded to the inboard side of the backup plate 106. The backup plate 106 and the washer 206 are drilled and tapped for reception of the securing bolt 202 therethrough. The securing bolt 202 has a head portion 204 and a threaded portion 205; said threaded portion 205 capable of threaded engagement with said bore of said backup plate 106 and said washer 206. In this embodiment the bores in the segmented baffle ring 200 are clearance holes for the bolts.

If desired, means may be used to secure or lock the bolt head 204 to the baffle ring 200. One such locking means 207, for example, comprises a deformable cylinder 208, for example made of brass, having a flat tail portion 210. A cylindrical portion 209 is deformed, as from a clamping action, onto the flat surfaces of the bolt head 204. The tail 210 of said locking means 207 is bent over the radially outward side of the baffle ring 200. This locking means 207 therefore prevents rotation of the securing bolt 202.

To inhibit leakage a seal 216, such as a rubber or neoprene material, can be placed around the baffle ring 200 where it contacts the backup plate 106. The rubber seal 216 can be secured in position by placing a portion or lip of the rubber seal 216 in a cavity 218 in the baffle ring 200. This cavity 218 and the lip of the rubber seal 216, for example, can be sized to require a snapping action during assembly. The rubber seal 216, during assembly, slides along the top stator coil surface as the baffle ring 200 is installed; said seal deforming slightly during assembly. The direction of the air pressure in an operating dynamoelectric machine is such that the seal is forced tighter as the blower increases, since this lowers the relative pressure on the inboard side. The seal 216 will also contact the tips of the finger plates 102.

It should be noted that a perfect seal is not required. Inspection of prior art designs has revealed small leakage areas. Such leakage areas are permissible so long as they represent no more than, for example, 10% of the total flow area through the air gap.

Referring now to FIG. 5, it can be seen that rotor installation or removal can be facilitated through the use of a multi-segmented baffle ring 200. Though the baffle ring 200 according to this invention may be made of one-piece construction in an annular geometry, it is preferable to construct the baffle ring 200 of a plurality of segments 201. For example, a preferred configuration is to construct the baffle ring 200 from six 60° segments 201 as shown in the figure. Each segment must be secured to the backup plate 106 by at least one securing bolt 202. An alternate configuration is to construct the ring 200 from two segments, a 290° arc piece and a separate 70° arc piece. To access, install or remove the rotor the 60° arc piece, in this example, may be removed to facilitate application of the appropriate tooling. To aid in the alignment of the two segments of the baffle ring 200 in this example, the edges of the segments may be provided with dovetail alignment slots.

In those generator designs where low airgap flow is required, an insert 212, for example made from $\frac{3}{8}''$ thick Teflon, may be fastened to the baffle ring 200 on its radially inward surface. The Teflon insert 212 may also be for example of a segmental annular construction. When assembled the close proximity of the insert 212 to the retaining ring 111, forms a generally annular orifice that permits the reduced flow of coolant. The Teflon insert may for example be fastened by etching it along its radially outward surface 213, and applying a bonding agent to secure the surface 213 to the baffle ring 200. For added tightness, it is also pinned. This is accomplished through the use of a glass pin 214 which proceeds through a bore in the baffle ring 200, and is inserted from the side of said baffle ring 200 on which is located, after assembly, the bolt head 204 (i.e. from the outboard side). The insert reduces the size of the air gap and thereby regulates for low flow rates.

It has been empirically found that the orifice or clearance between the Teflon insert 212 and the retaining ring 111 can be as little as 0.09 inches. During extreme conditions, this small clearance may be insufficient to prevent chafing between these features. However, due to the inherent lubricity of Teflon, this chafing will not harm the retaining ring 111, as would a glass (such as the baffle ring 200) rubbing against it for a prolonged period. The Teflon insert can be placed into the baffle ring 200 (when the baffle assembly 125 is first constructed; or after, when it is needed) by removing, for example, a segment of the assembly 125 from the machine.

Figure 6:
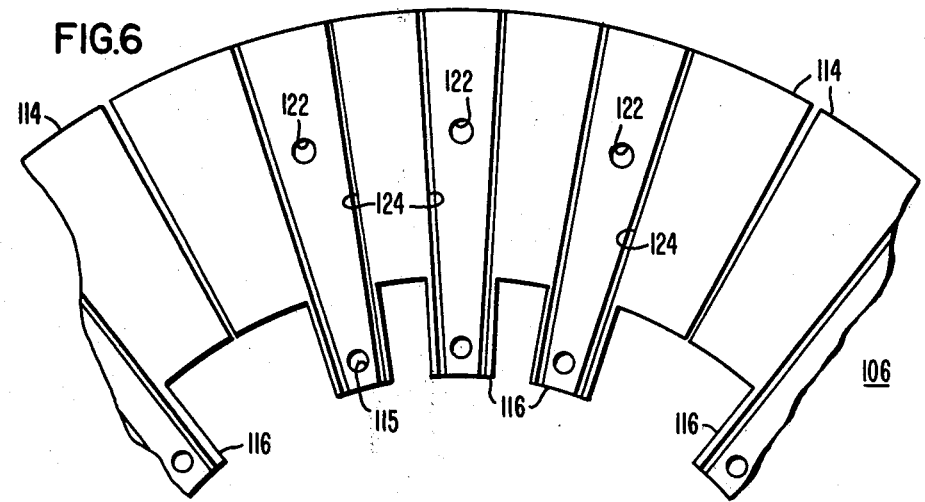
FIG. 6 is a partial front view of a segmental backup plate embodying the invention.

Referring now to FIG. 6, the backup plate 106 deserves a more detailed discussion. It will be understood that in large machine, the annular core punchings or laminations are made of individual segments in order to facilitate handling during manufacture. Similarly, the backup plate 106 of the present invention is composed of segments, although a complete annular plate could be utilized, depending for example on material availability.

Each of the segments 114 shown in FIG. 6 is a rigid non-magnetic plate of sufficient thickness to yield the desired rigidity and mechanical stability. It is preferably made of stainless steel about one-quarter inch thick. The segments 114 have the same configuration as the punching segments (not shown) from which the laminations are made. Each of the segments 114 has a plurality of teeth 116 forming slots for the stator winding (not shown). Bores 115 are provided for receiving the securing bolt of the baffle assembly.

Various openings may be provided as required by the design of the particular machine, including holes 122 for clamping bolts or axial coolant passages. These holes 122 are, of course, aligned with similar ones in the core punchings to form axial openings extending through the core. Grooves 124 may be manufactured, as by machining, on one side of the segment 114 to provide for radial coolant gas flow. The grooves 124 extend from the teeth 116 to the periphery of the plate 114. (The complete gas flow path through the machine has not been shown since any suitable or well-known type of ventilation system may be used).

While a particular embodiment of the invention has been shown and described for purpose of illustration, other arrangements and embodiments may be practiced by those skilled in the art without departing from the scope and spirit of the invention. It is not desired, therefore, that the invention be limited to this specific arrangement described herein.

We claim:

1. A dynamoelectric machine with a baffle assembly, comprising:
   (a) a generally tubular shaped stator assembly including a laminated core, a stator winding disposed within said core, and a non-magnetic backup plate disposed at a first end of said stator core;
   (b) a generally cylindroid shaped rotor assembly axially and rotatably mounted within said stator, with an air gap space between the outer circumference of said rotor and the inner circumference of said stator;
   (c) a baffle assembly mounted over said air gap at the first end of said stator core; said baffle assembly including an annular-shaped, non-magnetic baffle ring having a plurality of bores therethrough, and a plurality of bolts receivable through said bores to secure said baffle ring to said backup plate; and
   a non-magnetic insert disposed between the inner circumference of said baffle ring and the outer circumference of said rotor, said insert being connected to said baffle ring with the radially inward edge of said insert being proximate said rotor circumference. whereby said insert is used to reduce the air gap and thereby regulate for low coolant flow rates through said air gap.

2. The dynamoelectric machine of claim 1 wherein the baffle assembly comprises a plurality of arcuate segments, each segment secured to said backup plate by at least one bolt.

3. The dynamoelectric machine of claim 1 wherein the insert is teflon, and is secured to said baffle ring by a glass pin.

4. The dynamoelectric machine of claim 2 wherein the baffle assembly further comprises a seal for inhibiting leakage between the baffle ring and the stator.

5. The dynamoelectric machine of claim 4 wherein the seal is rubber and snaps into a cavity on the outer circumference of the baffle ring.

6. The dynamoelectric machine of claim 2 wherein the baffle ring is filament wound glass, and the bolts are stainless steel.

7. The dynamoelectric machine of claim 2 wherein one of the segments is less than a 70° arcuate segment of the baffle ring; whereby said segment is sized for its expeditious removal from said dynamoelectric machine to allow access to said rotor assembly.

* * * * *